United States Patent
Kiyosawa et al.

(10) Patent No.: US 9,114,391 B2
(45) Date of Patent: Aug. 25, 2015

(54) METHOD FOR REMOVING ARSENIC COMPOUND, METHOD FOR REGENERATING NOX REMOVAL CATALYST, AND NOX REMOVAL CATALYST

(75) Inventors: Masashi Kiyosawa, Tokyo (JP); Norihisa Kobayashi, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 0 days.

(21) Appl. No.: 14/007,940

(22) PCT Filed: Feb. 24, 2012

(86) PCT No.: PCT/JP2012/054538
§ 371 (c)(1),
(2), (4) Date: Sep. 26, 2013

(87) PCT Pub. No.: WO2012/132683
PCT Pub. Date: Oct. 4, 2012

(65) Prior Publication Data
US 2014/0018231 A1    Jan. 16, 2014

Related U.S. Application Data

(60) Provisional application No. 61/468,788, filed on Mar. 29, 2011.

(51) Int. Cl.
| | | |
|---|---|---|
| *B01J 38/02* | (2006.01) | |
| *B01J 38/04* | (2006.01) | |
| *B01J 21/20* | (2006.01) | |
| *B01J 23/92* | (2006.01) | |
| *B01J 38/12* | (2006.01) | |
| B01J 21/06 | (2006.01) | |
| B01J 23/22 | (2006.01) | |
| B01J 23/30 | (2006.01) | |

(52) U.S. Cl.
CPC *B01J 38/04* (2013.01); *B01J 21/20* (2013.01); *B01J 23/92* (2013.01); *B01J 38/12* (2013.01); B01J 21/063 (2013.01); B01J 23/22 (2013.01); B01J 23/30 (2013.01)

(58) Field of Classification Search
CPC .................................. B01J 38/02; B01J 38/04
USPC ........................................ 502/34, 56, 514, 515
See application file for complete search history.

(56) References Cited

U.S. PATENT DOCUMENTS

| | | | |
|---|---|---|---|
| 4,925,640 | A | 5/1990 | Morii et al. |
| 5,942,458 | A | 8/1999 | Berthier et al. |
| 6,596,661 | B2 | 7/2003 | Neufert |
| 2001/0003116 | A1 | 6/2001 | Neufert |
| 2001/0012817 | A1 | 8/2001 | Nojima et al. |
| 2010/0292070 | A1 | 11/2010 | Obayashi et al. |

FOREIGN PATENT DOCUMENTS

| | | | |
|---|---|---|---|
| JP | 63-65937 | A | 3/1988 |
| JP | 64-080444 | A | 3/1989 |
| JP | 01-139146 | A | 5/1989 |
| JP | 04-161230 | A | 6/1992 |
| JP | 07-029049 | B2 | 4/1995 |
| JP | 2000-037635 | A | 2/2000 |
| JP | 2004-066101 | A | 3/2004 |
| JP | 2005-087901 | A | 4/2005 |
| JP | 2008-222499 | A | 9/2008 |
| JP | 2009-132960 | A | 6/2009 |
| JP | 2009-226388 | A | 10/2009 |
| JP | 4574851 | B | 11/2010 |
| JP | 2011-074408 | A | 4/2011 |

OTHER PUBLICATIONS

International Search Report dated Jun. 5, 2012, issued in corresponding application No. PCT/JP2012/054538.
Written Opinion dated Jun. 5, 2012, issued in corresponding application No. PCT/JP2012/054538.
Decision to Grant a Patent dated Jan. 6, 2015, issued in corresponding Japanese Patent Application No. 2013-507282 (3 pages).

*Primary Examiner* — Edward Johnson
(74) *Attorney, Agent, or Firm* — Westerman, Hattori, Daniels & Adrian, LLP

(57) ABSTRACT

Provided is a practical method for dry-separating arsenic compounds from a used NOx removal catalyst contaminated with arsenic. The method for removing arsenic compounds comprises heat-treating a NOx removal catalyst contaminated with arsenic compounds at a predetermined temperature in a reducing atmosphere while exposing the catalyst to hydrocarbon compounds (except $CH_4$) or oxygen-containing carbon compound.

12 Claims, 3 Drawing Sheets

METHOD FOR REMOVING ARSENIC COMPOUND, METHOD FOR REGENERATING NOX REMOVAL CATALYST, AND NOX REMOVAL CATALYST

TECHNICAL FIELD

The present invention relates to a method for removing arsenic compounds, a method for regenerating a NOx removal catalyst, and a NOx removal catalyst. Particularly, the present invention relates to a method for removing arsenic compounds adsorbed on a NOx removal catalyst for removing nitrogen oxides in combustion exhaust gas.

BACKGROUND ART

Operation of coal-fired boilers, heavy oil-fired boilers, and combustion furnaces attached to various chemical devices emits exhaust gas containing nitrogen oxides (hereinbelow, abbreviated as NOx). NOx, which are air contaminants that cause photochemical smog and acid rain, have to be removed from exhaust gas before the exhaust gas is emitted outside plants. One method to remove NOx from exhaust gas includes the selective catalytic reduction method. The selective catalytic reduction method is a method for decomposing NOx by reaction of NOx with ammonia using a reduction catalyst to detoxify NOx. The selective catalytic reduction method is widely industrialized as the most economical and effective method.

FIG. 4 exemplifies a configuration of a NOx removal device using the selective catalytic reduction method. In FIG. 4, combustion exhaust gas generated in a boiler 1 passes through a superheater 2 and economizer 3, and arrives at a flue 4 to be introduced into a NOx removal reactor 6. The flue 4 is provided with an ammonia injector 5, which injects ammonia gas necessary for NOx removal reaction into the flue 4. NOx in the combustion exhaust gas are decomposed into nitrogen and water while passing through a catalyst layer 7 placed in the NOx removal reactor 6. Then, the combustion exhaust gas passes through an air heater 8, an electric precipitator 9, and a combustion exhaust gas fan 10 to be emitted from a chimney 11 to the air.

A catalyst layer 7 placed in the NOx removal reactor 6 is mainly composed of a parallel gas flow type catalyst in a grid or plate shape. In the form of the parallel gas flow type catalyst, combustion exhaust gas flows in parallel along a surface of the NOx removal catalyst. Thus, there is an advantage that dust and soot in combustion exhaust gas have few opportunities to come in contact with the surface of the NOx removal catalyst to thereby be slightly deposited on the surface of the NOx removal catalyst. Accordingly, such type of catalyst is widely adopted for NOx removal devices such as coal-fired NOx removal devices and heavy oil-fired NOx removal devices.

The NOx removal catalyst adopted in these NOx removal devices has a substrate of titanium oxide ($TiO_2$). The substrate carries active components such as vanadium pentoxide ($V_2O_5$), tungsten oxide ($WO_3$), and molybdenum oxide ($MoO_3$).

Although the aforementioned NOx removal catalyst can attain a high NOx removal performance over a wide range of temperatures, it has a problem that the performance is gradually degraded over a long-term use. The causes of degradation in the NOx removal performance include (1) clogging of gas passage channel by deposition of dust and soot on the surface of the NOx removal catalyst surface, (2) poisoning of the NOx removal catalyst by diffusion of poisoning components in the dust and soot deposited on the surface of the NOx removal catalyst into the NOx removal catalyst, (3) prevention of progression of NOx removal reaction by physical adsorption of a substance contained in fuel to be catalyst poison on the NOx removal catalyst after gasification in a furnace or by chemical reaction of the substance with catalyst components.

The degradation in the NOx removal performance caused by deposition of dust and soot on the surface of the NOx removal catalyst, as (1) or (2) aforementioned, is expected to be suppressed by installation of a dust collector at the combustion exhaust gas inlet of the catalyst layer 7 to reduce the amount of dust and soot arriving at the catalyst layer 7.

In contrast, when the NOx removal catalyst is poisoned by gaseous components as (3) aforementioned, no measures to prevent arrival of poisoning components at the catalyst layer 7 are available now. Thus, durability of the NOx removal catalyst largely depends on types and amounts of toxic substances contained in fuel.

Coal-fired boilers use coal as fuel. Quality of coal varies a great deal depending on the source of the coal, and some coal contains much arsenic. Arsenic is a poisoning component and has a strong action as catalyst poison. When coal containing arsenic in the order of ppm is used as fuel, arsenic deposits on active sites of the NOx removal catalyst to thereby deactivate the active sites in several tens of thousand hours. Accordingly, measures against arsenic are important for installation of a NOx removal facility in a coal-fired boiler and the like.

Arsenic in fuel, the most part of which is gasified when the fuel is burned in a furnace, is present in the form of arsenic trioxide ($As_2O_3$). For $As_2O_3$ gas, reaction of the equation (1) or (2) is thermodynamically expected to progress in the temperature range of the vicinity of where the NOx removal device is installed.

$$As_2O_3 + O_2 \rightarrow As_2O_5 \tag{I}$$

$$3CaO + As_2O_3 + O_2 \rightarrow Ca_3(AsO_4)_2 \tag{II}$$

In the equation (I), $As_2O_3$ reacts with the surrounding oxygen to change into diarsenic pentoxide in solid state.

In the equation (II), $As_2O_3$ reacts with CaO contained in dust and soot to change into calcium arsenate ($Ca_3(AsO_4)_2$) in solid state.

$As_2O_5$ and $Ca_3(AsO_4)_2$ formed according to the equations (I) and (II) are in solid particle form. Therefore, even if the compounds deposit on the surface of the NOx removal catalyst, the possibility of the compound to be incorporated into the catalyst is low, and influence on the activity of the NOx removal catalyst should be small. However, catalyst deterioration is actually caused by arsenic. In view of above, since the reaction rate of the equation (1) is low, the considerable amount of arsenic is believed to be still present in $As_2O_3$ gaseous form also in the vicinity of the catalyst layer 7.

As measures against the deterioration of the catalyst caused by the aforementioned arsenic, a method for preventing deterioration of NOx removal catalyst by installation of an adsorbent-filled layer to adsorb and remove arsenic compounds in the combustion exhaust gas passage upstream of the NOx removal catalyst-filled layer is suggested (see Patent Literatures 1 and 2).

Patent Literatures 3 and 4 suggest a method for wet-washing a NOx removal catalyst with an acid aqueous solution of pH 4 or less and a quaternary ammonium hydroxide.

Patent Literature 5 suggests a method for separating arsenic from a NOx removal catalyst using an inert gas such as Ar, $N_2$, and He containing a reducing agent. In Patent Literature 5, the reducing agent is $H_2$, CO, or $CH_4$, which is contained in the inert gas at 2% (on volume basis). In Patent Literature 5, treatment with the inert gas containing a reducing agent is carried out under the temperature condition of 500° C. or more, and preferably of 700° C. to 900° C.

Patent Literature 6 suggests a method for wash treatment with a multifunctional complex compound after reduction treatment with $SO_2$, CO, $H_2$, $CH_4$, $NH_3$, and the like that are added with HCl.

CITATION LIST

Patent Literature

{PTL 1}
Japanese Unexamined Patent Application, Publication No. Sho 63-65937
{PTL 2}
Japanese Examined Patent Application, Publication No. Hei 07-029049
{PTL 3}
Japanese Unexamined Patent Application, Publication No. 2005-87901
{PTL 4}
Japanese Unexamined Patent Application, Publication No. 2004-66101
{PTL 5}
U.S. Pat. No. 5,942,458
{PTL 6}
U.S. Pat. No. 6,596,661

SUMMARY OF INVENTION

Technical Problem

The method described in Patent Literatures 1 and 2 have not been put into practical use. The NOx removal catalyst that has been used for a long time in a coal-fired boiler is replaced as consumables because the NOx removal performance is degraded due to arsenic.

In the methods described in Patent Literatures 3 and 4, which perform wet-washing, treatment of wash water containing arsenic after washing causes a problem. Separation of arsenic from the NOx removal catalyst in wet-washing requires 3 to 4 cubic meters of wash water per cubic meter of the catalyst. Specifically, about 400 tons of wash water is required for 100 cubic meters of the NOx removal catalyst. Thus, in consideration of disposal costs and the like, used NOx removal catalysts are disposed at present.

In the method of Patent Literature 5, the NOx removal catalyst deteriorates due to treatment of the NOx removal catalyst under a high temperature condition, and the NOx removal performance is degraded. Accordingly, the method has not been put into practical use.

Patent Literature 6 states that wash treatment with a multifunctional complex compound is required because a method using a reducing agent cannot treat arsenic. That is, the method of Patent Literature 6 requires a wet-washing process as those of Patent Literatures 3 and 4.

As described above, due to lack of practical techniques for separating arsenic from NOx removal catalysts, NOx removal catalysts with degradation in the performance caused by arsenic have been disposed. However, NOx removal catalysts contain many rare metals, such as titanium dioxide, tungsten, molybdenum, and vanadium, and techniques to collect and recycle these rare metals are desired.

The present invention has been made in view of the above situation, and aims to provide a practical method for dry-separating arsenic compounds from a used NOx removal catalyst contaminated with arsenic.

Solution to Problem

As described above, the current technique requires treatment at 700° C. or more or washing in order to separate As, but no low-temperature and dry treatment has been suggested so far. The present inventors have invented, through their extensive research, a method for separating arsenic compounds from a NOx removal catalyst in a low-temperature and dry process.

To solve the aforementioned problem, the present invention provides a method for removing an arsenic compound, comprising heat-treating a NOx removal catalyst contaminated with the arsenic compound at a predetermined temperature in a reducing atmosphere while exposing the catalyst to hydrocarbon compounds except $CH_4$ or oxygen-containing carbon compounds.

According to the invention, heat treatment of the NOx removal catalyst contaminated with the arsenic compound under exposure to hydrocarbon compounds (except $CH_4$) or oxygen-containing carbon compounds allows separation and removal of the arsenic compound from the NOx removal catalyst.

In one embodiment of the invention, the hydrocarbon compounds and the oxygen-containing carbon compounds are preferably gaseous at the predetermined temperature.

According to one embodiment of the invention, the NOx removal catalyst contaminated with the arsenic compound may be exposed to hydrocarbon compounds or oxygen-containing carbon compounds in gas state. This allows separation and removal of the arsenic compound at a lower temperature by the dry process, which has been conventionally unfeasible.

In one embodiment of the invention, the predetermined temperature is preferably more than 300° C. to 600° C. or less.

According to one embodiment of the invention, since the NOx removal catalyst contaminated with the arsenic compound is exposed to hydrocarbon compounds (except $CH_4$) or oxygen-containing carbon compounds, the arsenic compound can be separated and removed from the NOx removal catalyst even in a case of heat treatment at a low temperature of 600° C. or less. If the temperature of heat treatment is too low, the arsenic compound cannot be separated and removed from the NOx removal catalyst.

In one embodiment of the invention, the NOx removal catalyst contaminated with the arsenic compound, in a product form as is or after made into a particle form, by grinding treatment may be exposed to the hydrocarbon compounds or the oxygen-containing carbon compounds.

According to one embodiment of the invention, the arsenic compound can be separated and removed from the NOx removal catalyst contaminated with the arsenic compound, in either of a product form as is used in an actual device, or particle form made by grinding treatment of the product, by heating at a predetermined temperature and exposure to hydrocarbon compounds or oxygen-containing carbon compounds.

The present invention provides a method for regenerating a NOx removal catalyst, comprising removing an arsenic compound by the aforementioned method for removing an arsenic compound.

The NOx removal catalyst that has been used for a long time is contaminated with the arsenic compound and has degradation in the catalytic performance. According to the invention, by removal of the arsenic compound by the aforementioned method, the NOx removal catalyst can be recycled without disposal of the catalyst as consumables. According to the invention, since the arsenic compound can be separated and removed by the dry process, there is no need to perform disposal treatment of a washing solution that contains arsenic compounds. According to the invention, since the treatment is performed at a low temperature, the arsenic compound can be removed from the NOx removal catalyst while degradation of the NOx removal catalyst is suppressed. According to the invention, rare metals, such as titanium dioxide, tungsten, molybdenum, and vanadium, contained in the NOx removal catalyst can be recycled without disposal.

In one embodiment of the invention, the NOx removal catalyst from which the arsenic compound has been removed is preferably heat-treated at 250° C. or more in an oxygen atmosphere. This allows separation and removal of the arsenic compound at a lower temperature by the dry process, which has been conventionally unfeasible.

According to one embodiment of the invention, when the arsenic compound is removed, excess carbon-based compounds deposited on the NOx removal catalyst can be removed. Since excess carbon is an impurity to the catalyst, removal of the impurity can prevent degradation in the performance.

The present invention provides a NOx removal catalyst regenerated by the aforementioned method for regenerating a NOx removal catalyst.

The NOx removal catalyst regenerated as above-mentioned can be recycled as a NOx removal catalyst because its catalytic performance has been improved.

Advantageous Effects of Invention

In accordance with the present invention, an arsenic compound can be removed from a used NOx removal catalyst contaminated with the arsenic compound by a dry process at a low temperature in a practical method.

DESCRIPTION OF EMBODIMENTS

Figure 1:
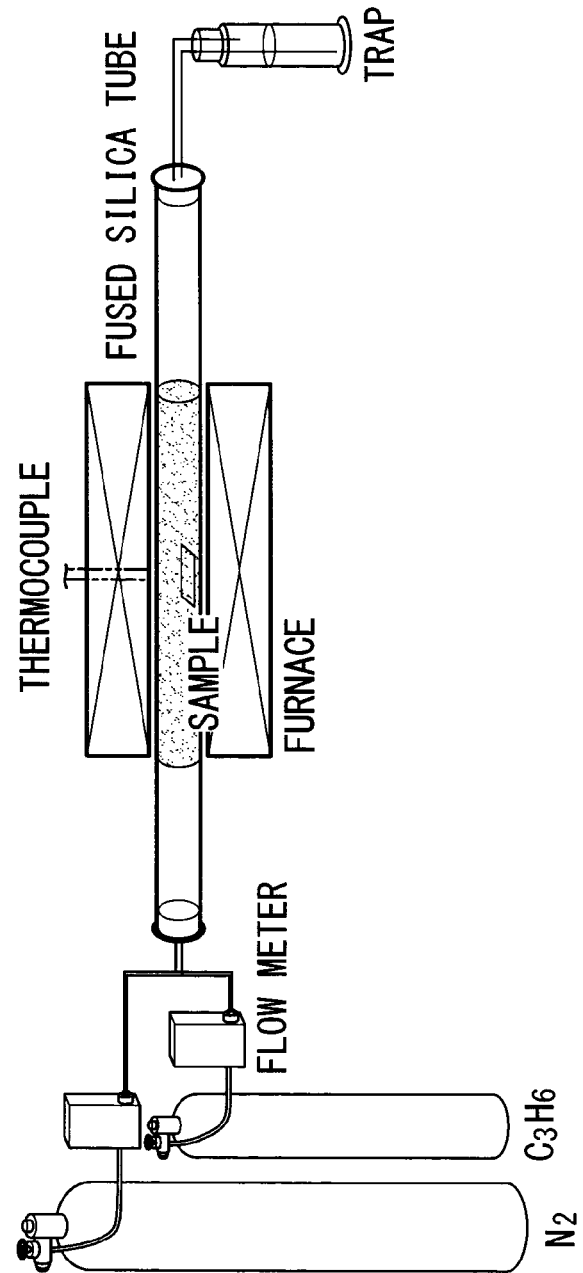
FIG. 1 is the schematic view of a testing device.

One embodiment of a method for removing an arsenic compound, a method for regenerating a NOx removal catalyst, and a NOx removal catalyst regenerated by the regenerating method according to the present invention is described hereinbelow.

In this embodiment, a NOx removal catalyst contaminated with arsenic compounds is heat-treated at a predetermined temperature in a reducing atmosphere while the catalyst is exposed to hydrocarbon compounds (except $CH_4$) or oxygen-containing carbon compound. This allows separation and removal of arsenic compounds from the NOx removal catalyst. The NOx removal catalyst from which arsenic compounds have been removed may be heat-treated at 250° C. or more in an oxygen atmosphere. This allows removal of carbon-based compounds excessively deposited on the NOx removal catalyst from the NOx removal catalyst.

The NOx removal catalyst contains any of titanium dioxide ($TiO_2$), tungsten oxide ($WO_3$), molybdenum oxide ($MoO_3$), and vanadium pentoxide ($V_2O_5$) that are rare metals.

In this embodiment, the NOx removal catalyst should be the one used for a long time in a coal-fired boiler that uses coal containing arsenic as fuel. The NOx removal catalyst that has been used for a long time in a coal-fired boiler using coal that contains arsenic as fuel is contaminated with arsenic compounds contained in soot and dust. Arsenic is a poisoning component to a NOx removal catalyst. When a NOx removal catalyst becomes contaminated with arsenic compounds, the catalytic performance of the NOx removal catalyst is degraded. "Contaminated with arsenic compound(s)" herein refers to a state in which arsenic compound(s) is physically deposited on the surface of a NOx removal catalyst or a state in which arsenic or arsenic compound(s) is chemically bonded to the surface of a NOx removal catalyst.

Hydrocarbon compounds (except $CH_4$) or oxygen-containing carbon compounds (alcohols) serve as reducing agents. Setting the carbon number to 2 or more enables the reactivity as a reducing agent to be secured. Hydrocarbon compounds (except $CH_4$) or oxygen-containing carbon compounds preferably have a property of being present as gas when heat treatment is performed at a predetermined temperature. For example, the carbon number is preferably $C_2$-$C_{18}$, and more preferably $C_2$-$C_4$. Specifically, the hydrocarbon compound (except $CH_4$) may be selected from ethane ($C_2H_6$), propane ($C_3H_8$), cyclopropane ($C_3H_6$), propene ($C_3H_6$), butane ($C_4H_4O$), cyclobutane ($C_4H_8$), butene ($C_4H_8$), methanol ($CH_3OH$), ethanol ($C_2H_6O$), propanol ($C_3H_8O$), and butanol ($C_4H_{10}O$) and the like.

The NOx removal catalyst may be made in a product form or particle form. For example, a product form of the NOx removal catalyst is made as honeycomb form. A NOx removal catalyst in a particle form can be produced by grinding of a NOx removal catalyst product in an appropriate manner. Although the size of particles and the like are not particularly limited, fine grinding of the product can increase the reaction area.

The predetermined temperature of heat treatment is more than 300° C. to 600° C. or less, preferably 350° C. or more to 600° C. or less, and more preferably 400° C. or more to 500° C. or less. If the predetermined temperature is too low, arsenic cannot be removed from the NOx removal catalyst. If the predetermined temperature is too much higher than the sintering temperature of the NOx removal catalyst, the NOx removal catalyst will deteriorate and the catalytic performance is degraded.

Heat treatment time is set appropriately depending on the form and amount of the NOx removal catalyst, the heat treatment temperature, the heat gas composition and the like.

According to the aforementioned process, removal of arsenic from the NOx removal catalyst allows collection of rare metals contained in the NOx removal catalyst. Additionally, the NOx removal catalyst from which arsenic has been removed according to this embodiment has the improved NOx removal performance, and can be used as a NOx removal catalyst again.

Example 1

A catalyst with the composition shown in Table 1 was used as NOx removal catalyst A. The composition of NOx removal catalyst A was analyzed with Induced Coupled Plasma Emission Spectroscopy (ICP). NOx removal catalyst A is the catalyst that was actually used in a NOx removal device of an actual coal-fired boiler for 3,500 hours. NOx removal catalyst A contains diarsenic pentoxide at a proportion of 3.5% by weight.

TABLE 1

| Component | Composition (wt %) |
|---|---|
| $TiO_2$ | 75.2 |
| $WO_3$ | 7 |
| $Al_2O_3$ | 2 |
| $SiO_2$ | 8.5 |
| CaO | 1.8 |
| $V_2O_5$ | 0.5 |
| MgO | 0.1 |
| $Fe_2O_3$ | 0.3 |
| $Na_2O$ | 0.1 |
| $K_2O$ | 0.1 |
| $SO_3$ | 0.9 |
| $As_2O_5$ | 3.5 |

First, NOx removal catalyst A was ground in a mill to prepare Particles A less than 200 mesh. Then, 0.2 g of Particle A was placed in a silica reaction tube. A test was performed using the reaction tube in an electric furnace under the following conditions to examine a situation in which arsenic is leaving from the catalyst.

<Test Conditions 1>
Temperature; 100° C.-500° C.
Temperature rising rate; 10° C./min
Treatment gas; $C_3H_6$ (propene)
Treatment gas flow rate; 100 NTP-mL/min (NTP: standard state, normal temperature and pressure)

A schematic view of a testing device is shown in FIG. 1. The reaction tube was placed in an electric furnace, and a gaseous hydrocarbon compound ($C_3H_6$ gas) was supplied into the electric furnace at the aforementioned treatment gas flow rate while the temperature of the electric furnace was raised at a temperature rising rate of 10° C. per minute. The $C_3H_6$ gas filled in the electric furnace was exhausted through a trap containing an absorbent liquid capable of absorbing arsenic components to outside the electric furnace. The test was performed five times at from room temperature to 100° C., from room temperature to 200° C., from room temperature to 300° C., from room temperature to 400° C., and from room temperature to 500° C., with new sample powder placed in the reaction tube for each test. The volatilized amount was calculated from the difference between the arsenic content in the powder after the test, which was measured with an ICP (optical emission spectrometer), and the concentration before the treatment.

Figure 2:
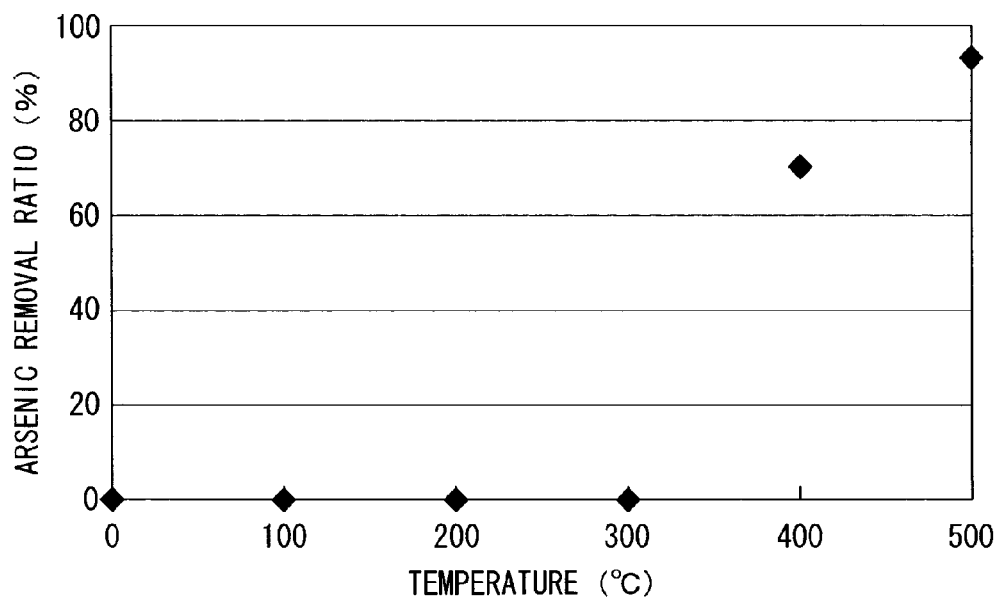
FIG. 2 is a graph showing arsenic ratios in volatile components at the time of treatment with $C_3H_6$ gas.

Arsenic ratios in volatile components at the time of treatment with $C_3H_6$ gas are shown in FIG. 2. In FIG. 2, the horizontal axis represents temperatures, and the vertical axis represents arsenic removal ratios. When all the arsenic components contained in Particle A before treatment are removed, the arsenic removal ratio is taken as 100.

According to FIG. 2, it was found that the arsenic components were vaporized and separated from Particles A by heat treatment of the arsenic-containing catalyst in a temperature range from more than 300° C. to about 500° C. in a $C_3H_6$ gas atmosphere. That is, it was shown that the arsenic compounds were able to be separated and removed from the NOx removal catalyst.

Even when NOx removal catalyst A still in the honeycomb form before grinding was exposed to hydrocarbon compounds except $CH_4$, in a reducing atmosphere, the result similar to Example 1 was obtained.

Comparative Example 1

NOx removal catalyst A similar to that of Example 1 was used. NOx removal catalyst A was ground to prepare Particles A less than 200 mesh, as in Example 1. To 0.2 g of Particles A, an equivalent amount (on the weight basis) of granular solid carbon prepared by carbonization of phenolphthalein as a reducing agent was mixed, and these mixed particles were placed in a silica reaction tube. A test was performed using the reaction tube in an electric furnace under the following conditions to examine a situation in which arsenic is leaving from the catalyst.

<Test Conditions 2>
Temperature; 100° C.-500° C.
Temperature rising rate; 10° C./min
Treatment gas; $N_2$
Treatment gas flow rate; 100 NTP-mL/min (NTP: normal temperature and pressure)

Specifically, except that solid carbon particles were mixed into Particles A and that N2 was used as the treatment gas, the catalyst was treated as in Example 1 and the arsenic content in volatile component was determined.

Figure 3:
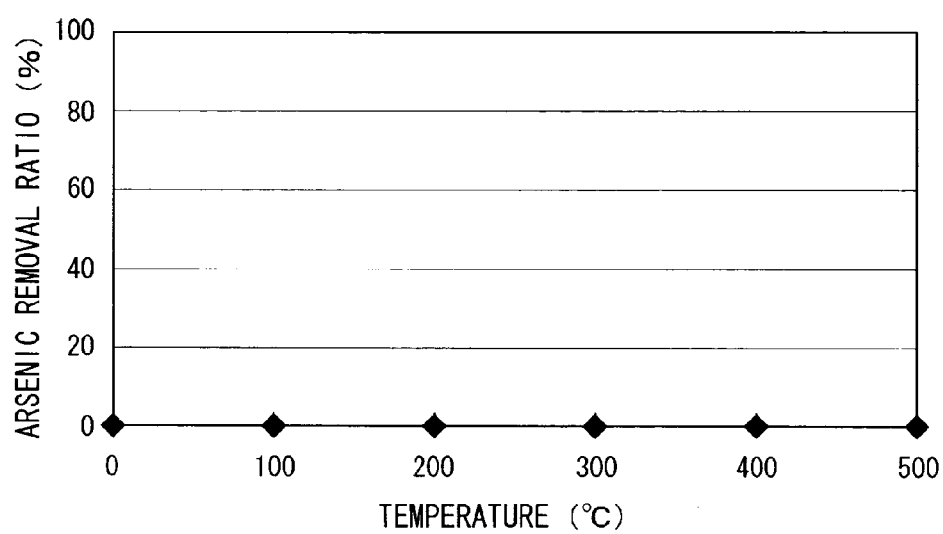
FIG. 3 is a graph showing ratios of arsenic in volatile components at the time of addition of solid carbon and treatment with N2 gas.
Figure 4:
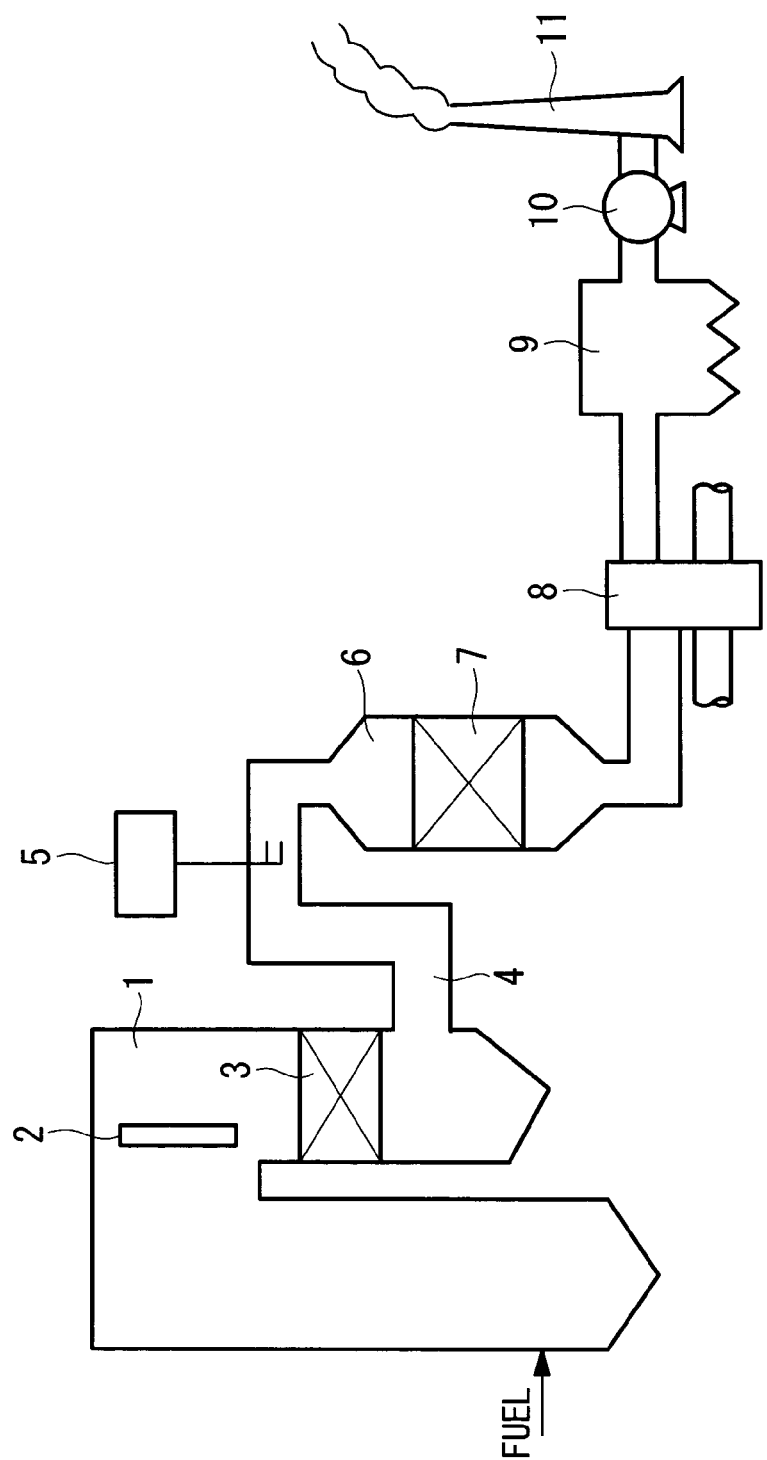
FIG. 4 exemplifies a configuration of a NOx removal device using the selective catalytic reduction method.

Arsenic ratios in volatile components at the time of treatment with $N_2$ gas is shown in FIG. 3. In FIG. 3, the horizontal axis represents temperatures, and the vertical axis represents arsenic removal ratios. When all the arsenic components contained in Particles A before treatment are removed, the arsenic removal ratio is taken as 100.

According to FIG. 3, it was shown that the arsenic compounds could not be removed even when the arsenic-containing catalyst was mixed with solid carbon and heat-treated (about 500° C.) in an N2 gas atmosphere,

REFERENCE SIGNS LIST

1 Boiler
2 Superheater
3 Economizer
4 Flue
5 Ammonia injector
6 NOx removal reactor
7 Catalyst layer
8 Air heater
9 Electric precipitator
10 Combustion exhaust gas fan
11 Funnel

The invention claimed is:

1. A method for removing an arsenic compound, comprising heat-treating a NOx removal catalyst contaminated with the arsenic compound at a predetermined temperature in a reducing atmosphere while exposing the catalyst to hydrocarbon compounds except $CH_4$ or oxygen-containing carbon compounds.

2. The method for removing an arsenic compound according to claim 1, wherein the hydrocarbon compounds and the oxygen-containing carbon compounds are gaseous at the predetermined temperature.

3. The method for removing an arsenic compound according to claim 1, wherein the predetermined temperature is in a range of greater than 300° C. to 600° C.

4. The method for removing an arsenic compound according to claim 1, wherein the NOx removal catalyst contaminated with the arsenic compound in a product form as is or after made into a particle form by grinding treatment is exposed to the hydrocarbon compounds or the oxygen-containing carbon compounds.

5. A method for regenerating a NOx removal catalyst, comprising removing the arsenic compound by the method according to claim 1.

6. The method for regenerating a NOx removal catalyst according to claim 5, wherein the NOx removal catalyst from which the arsenic compound has been removed is heat-treated at 250° C. or more in an oxygen atmosphere.

7. The method for removing an arsenic compound according to claim 4, wherein the NOx removal catalyst contaminated with the arsenic compound in a product form as is.

8. The method for removing an arsenic compound according to claim 4, wherein the NOx removal catalyst contaminated with the arsenic compound in a product form after made into a particle form by grinding treatment.

9. The method for removing an arsenic compound according to claim 1, wherein the hydrocarbon compounds and the oxygen-containing carbon compounds have a carbon number of 2 to 18.

10. The method for removing an arsenic compound according to claim 1, wherein the hydrocarbon compounds are selected from the group consisting of ethane, propane, cyclopropane, propene, butane, cyclobutane, butene, methanol, ethanol, propanol, and butanol.

11. The method for removing an arsenic compound according to claim 1, wherein the predetermined temperature is in a range of 400° C. to 500° C.

12. A dry process method for removing an arsenic compound, comprising:
   heat-treating a NOx removal catalyst contaminated with the arsenic compound at a predetermined temperature in a reducing atmosphere,
   while exposing the catalyst to hydrocarbon compounds except $CH_4$ or oxygen-containing carbon compounds.

* * * * *